United States Patent Office 3,000,724
Patented Sept. 19, 1961

3,000,724
MANUFACTURE OF NITROGEN CONTAINING COMPLEX FERTILIZERS
Pierre Louis Eugene Langlois, Grand-Quevilly, France, assignor to Compagnie de Saint-Gobain, Paris, France
No Drawing. Filed May 4, 1956, Ser. No. 582,650
Claims priority, application France May 6, 1955
8 Claims. (Cl. 71—39)

This invention relates to the manufacture of nitrogen containing complex fertilizers. The complex, phosphatic fertilizers containing nitrogen are obtained by attacking natural phosphate or other phosphate of fertilizer grade, finely divided or not, with nitric acid alone or in the presence of other mineral acids, such as, for example, added phosphoric acid or added sulphuric acid, with or without the removal of all or part of the calcium nitrate formed during the attack; liquid or gaseous ammonia is subsequently added to the acid sludge thus obtained so as to neutralize the sludge, transform the calcium nitrate to ammonium nitrate, and furnish the fertilizer with ammoniacal nitrogen.

In this process of making fertilizers the sludge described in the previous paragraph may contain, according to the acids which have been used in its preparation, dicalcium phosphate, mono-calcium phosphate, mono-ammonium phosphate, ammonium nitrate, sulphates of ammonia and of lime, and there may be added my mixing therewith salts of potassium and a certain amount of the final product of the process, the latter being added after being finely divided and dried. This incorporation of solid products into the ammoniacal sludge may be carried out in one or more horizontal mixers or in a granulating tube, according to the practices of the prior art.

The mixed product thus obtained goes to a dryer, in general to a horizontal rotary dryer, and from thence to a screen, after having been cooled or not. The screens yield three products, that which is for the market and which contains granules of sizes between upper and lower limiting dimensions which is sent to storage, the fines which are recycled through the mixing apparatus as described, and the gross particles which are broken up before being returned to an earlier stage of the process.

Most processes for making mixed phospho-nitric fertilizers follow the outline above and differ from it only in certain details, which are most frequently concerned with the method and place of adding the ingredients or in the construction of the apparatus. Many attempts have been made to improve this process and one frequently encounters enthusiastic claims for certain advances, but in the application of these processes for granulation and drying one still encounters a number of difficulties, despite all claims to the contrary:

The apparatus such as dryers, chutes, elevators, screens, breakers, and other parts which come in contact with the product or the sludge become encrusted to the extent that the apparatus must be stopped about once every day for cleaning;

The yield of the drying apparatus is mediocre and this leads either to increasing the temperature of the drying gas at inlet and outlet, which risks decomposing the nitrated parts of the fertilizer, or to increasing the quantity of drying air which has the disadvantage of requiring larger ventilators and a more substantial installation for the recovery of entrained dust;

Gross particles are formed in such substantial quantity as to increase both the work of the breakers and the power required to reduce them to a size sufficiently fine for recycling. This increase in power is most undesirable.

It is an object of the invention to prevent the sludge from encrusting the dryer. Another object is to increase the yield of the dryers and to extend the period of time between cleanings of the apparatus. Another object is to reduce the encrusting of other portions of the apparatus. Another object is to reduce the energy employed in the crushers and breakers. Another object is to prevent the agglomeration of granules in the storage bin. Another object is to reduce or eliminate the need for coating the granules prior to storage. Another object is to reduce the deliquescence of the product. Another object is to present the fertilizer in a new form which is more readily dissolved in the soil.

A particuar object of the invention is to make multicellular granular fertilizer.

The inventor has discovered that the ammoniated sludge has only slight wetting action on the fines which are returned from the final product, so that the product produced by the mixers of the prior art, which is introduced into the drier, is not homogeneous but contains aggregates of fines which are insufficiently wetted, as well as quantities which are too wet and sticky. When such a mixture arrives in contact with the walls of the apparatus, encrustation tends to follow rapidly. It is another object of the invention to secure a more perfect intermixing of the recycled fines with, and the wetting thereof by, the ammoniated mass.

The objects of the invention are accomplished, generally speaking, by liberating within and throughout the ammoniated sludge, before the mixing with fines or during the course of it, bubbles of gas. This increases the surface which is in contact with the fines and is productive of most valuable results. The mixture obtained is much more homogeneous. The formation of wet spots is avoided and stickiness is reduced. The encrusting of the dryer and other parts is reduced to about one-half of that which previously occurred, so that an apparatus which previously had to be cleaned once a day can be cleaned every two days. During drying the contact of hot gas with the mixed product is better, because the product is made, by this treatment, in a condition of fine division and is porous. The yield of the dryer, and consequently the yield of the whole installation, is considerably increased. In practice it has been found that the yield of one commercial apparatus was doubled.

The introduction of finely divided gas, that is gas in bubbles which are liberated throughout the mass, may be carried out directly by introducing $CO_2$ gas or compressed air into the sludge, but it is preferred to carry out the introduction by the decomposition of substances which are capable of releasing gas by chemical reaction with one or more of the components of the sludge, or which are capable of releasing gas at the temperature of the mixer. Under these conditions, the gaseous bubbles are particularly fine and numerous, they produce a multicellular product, and the results are substantially superior to those obtained by direct release of compressed gas.

Among the substances which are used in practice, are the carbonates such as calcium carbonate and magnesium carbonate which yield $CO_2$ gas by reaction with the acid salts existing in the ammoniated sludge. These salts are particularly monocalcium phosphate and mono-ammonium phosphate. It has also been observed that one obtains good results by releasing in the ammoniated sludge a volume of gas equal to about three times the volume of the sludge. This amounts, in using calcium carbonate, to incorporating a quantity on the order of .7 to 1.2% of the weight of the finished fertilizer. This amount of calcium carbonate is introduced, finely divided, into the ammoniated sludge. As it is introduced the sludge foams and becomes spongy. The amount of calcium carbonate to be employed need not exceed about 3% of the weight of the fertilizer as, above that percentage, no improvement is observed and in some cases there is a decrease in efficiency.

By reason of this invention, the following advantages are attained: The mixture of sludge and fines does not tend to encrust the dryer, of which the yield is practically doubled; the dry products do not as quickly encrust the apparatus which follows the dryer such as elevators, screens and crushers; the energy expended in the crushers is less; no agglomeration takes place in storage even though the usual coating of the granulated product is omitted; the dried product in storage is not deliquescent even when it is not coated and even if the storage chamber is left open; the interior of the grains of fertilizer shows the existence of small cells and this new form of fertilizer is most valuable because it favors a rapid dissolving of the fertilizer in the soil.

The following examples are illustrative of the process but are not limitative of that which is generically stated elsewhere herein and claimed hereinafter:

*Example 1.—Manufacture of a ternary fertilizer 14, 14, 14*

The following ingredients were used:

1850 kgms. of natural phosphate from Morocco at 34% of $P_2O_5$.
810 kgms. of phosphoric acid at 50% of $P_2O_5$.
4325 kgms. of nitric acid at 52.5% of $HNO_3$.
619 kgms. of ammonia.
1650 kgms. of potassium chloride containing 60% of $K_2O$.

The apparatus permitted the manufacture of 7 tons per hour of this fertilizer by former methods, but at the end of about twelve hours of manufacture the encrustation became noticeable so that the manufacture had to be shut down while the apparatus was cleaned.

Now, by incorporating into the process, without otherwise altering it, 80 kgms. per hour of limestone, the addition being made to the ammoniated sludge, the same apparatus makes 10 tons per hour of the same fertilizer and does not have to be stopped for cleaning for 48 hours. Thus, there is improvement in yield and a doubled period of satisfactory operation.

*Example 2.—Manufacture of sulphonitric fertilizer 10, 10, 17*

In this manufacture there were employed:

1830 kgms. of natural phosphate from Morocco containing 34% of $P_2O_5$.
805 kgms. of sulphuric acid at 74% of $H_2SO_4$.
3060 kgms. of nitric acid at 45% of $HNO_3$.
380 kgms. of ammonia.
1715 kgms. of potassium chloride containing 60% $K_2O$.

The apparatus ran satisfactorily for 48 hours between cleanings.

When 80 kgms. of limestone were added the same installation produced 10.3 tons per hour of the same fertilizer and ran for five consecutive days without cleaning.

The products of Examples 1 and 2 are both new in that they constitute multi-cellular fertilizers.

This invention is applicable to fertilizer processes in which the acid reactants are nitric acid mixed with phosphoric acid or with sulphuric acid. The invention is also applicable to either of the foregoing cases in which ammoniation is carried out; the new process is now considered to be essential in cases where ammoniation has occurred. The invention is also useful in any of the preceding three cases in which a potassium salt is added to the mixture. The examples given represent processes which have been notorious for the particular difficulties against which this invention is directed.

As many apparently widely different embodiments of the present invention may be made without departing from the spirit and scope thereof, it is to be understood that the invention is not limited to the specific embodiments.

What is claimed is:

1. A method of making porous complex, ternary granular fertilizers containing N and K salts that comprises reacting phosphate of fertilizer grade with an acid comprising nitric acid, reacting the sludge resulting from the reaction by adding thereto a quantity of ammonia sufficient to transform substantially all of the calcium nitrate therein to ammonium nitrate without neutralizing the acid phosphate salts present in the reaction mass, permeating the sludge throughout its mass, after the ammoniation, with a substantial quantity of bubbles, of substantially inert gas, and recycling fine particles of finished product to the cellular insufflated sludge, said gaseous bubbles remaining substantially unreacted in the product, and recovering the porous fertilizer.

2. The method of claim 1 in which the addition of fine particles takes place during insufflation.

3. The method of claim 1 in which the addition of fine particles takes place after the sludge has been insufflated.

4. The method of claim 1 in which insufflation is by injection of gas.

5. The method of claim 1 in which insufflation is by formation in situ of gas bubbles by decomposition of a carbonate blowing agent in the sludge.

6. The method of claim 5 in which the blowing agent is equivalent in effect to about 0.7% to 3% of calcium carbonate based on the weight of the finished product.

7. The process of claim 1 in which the sludge contains gas-releasing agents being carbonates equivalent in amount to about 0.7% to about 3% $CaCO_3$ based on the weight of the finished fertilizer, which are reactive with acid salts in the ammoniated fertilizer.

8. In the method of making complex ternary phosphate fertilizers containing nitrogen and potassium comprising reacting phosphate of fertilizer grade with mineral acid comprised of nitric acid, neutralizing the acid liquor thus obtained by treating it with ammonia, mixing the ammoniated sludge thus obtained with at least one potassium salt and with fines resulting from the process, and finally granulating and drying the resulting fertilizer, the improvement which comprises: adding sufficient $NH_3$ to convert the calcium nitrate to ammonium nitrate, terminating the addition of ammonia to the reaction mass when the calcium nitrate is converted to ammonium nitrate, thus leaving the sludge acidic and containing at least one acid salt, and releasing substantial inert gas bubbles in substantial quantity throughout the sludge after the treatment of the sludge with ammonia and before the mixing of the potassium salt and the fines with the sludge, said gas remaining substantially unabsorbed by and unreacted with the sludge.

References Cited in the file of this patent

UNITED STATES PATENTS

| | | |
|---|---|---|
| 1,788,828 | Goldberg et al. | Jan. 13, 1931 |
| 1,931,768 | Moore | Oct. 24, 1933 |
| 2,053,432 | Harvey | Sept. 8, 1936 |
| 2,448,126 | Shoeld | Aug. 31, 1948 |
| 2,598,658 | Proctor et al. | May 27, 1952 |
| 2,680,680 | Coleman | June 8, 1954 |
| 2,738,265 | Nielsson | Mar. 13, 1956 |
| 2,739,886 | Facer | Mar. 27, 1956 |
| 2,845,340 | Karbe et al. | July 29, 1958 |
| 2,857,262 | Graham | Oct. 21, 1958 |